Dec. 25, 1962 W. D. ISBELL 3,069,777

AUTOMATIC REMOTE TAP QUANTITY TRANSMITTER FOR TAPE RECORDING EQUIPMENT

Filed May 5, 1958 2 Sheets-Sheet 1

INVENTOR.
WILLARD D. ISBELL
BY
ATTORNEY

Dec. 25, 1962 W. D. ISBELL 3,069,777

AUTOMATIC REMOTE TAP QUANTITY TRANSMITTER FOR TAPE RECORDING EQUIPMENT

Filed May 5, 1958 2 Sheets-Sheet 2

INVENTOR.
WILLARD D. ISBELL

BY [signature]

ATTORNEY 3,069,777

AUTOMATIC REMOTE TAPE QUANTITY TRANSMITTER FOR TAPE RECORDING EQUIPMENT

Willard D. Isbell, Tulsa, Okla., assignor to Midwestern Instruments, Inc., Tulsa, Okla., a corporation of Delaware Filed May 5, 1958, Ser. No. 733,060
5 Claims. (Cl. 33—172)

This invention relates to the measurement and indication of the length of tape in a roll such as in the supply reel of magnetic tape recording equipment, and has for its primary object the provision of means for assuring an operator that the tape-engaging feeler arm of the device is actually in operative engagement with the outer convolution of the roll whenever the case for the recorder is closed and such recorder placed in operation.

Another equally important object of the present invention is to provide a device of the aforementioned character that has means as a part thereof capable of automatically retracting the said feeler arm when the case is opened so that such arm will not interfere with replacement of the reel and the device cannot be damaged by such reel replacement procedures.

Another important object of the instant invention is to provide a relatively small, compact unit capable of automatically performing the functions above set forth and having all of the electro-mechanical components housed and assembled together for universal adaptation to virtually any type of equipment having tape or the like wound on a reel or other rotatable support.

Figures 1, 2, 3:
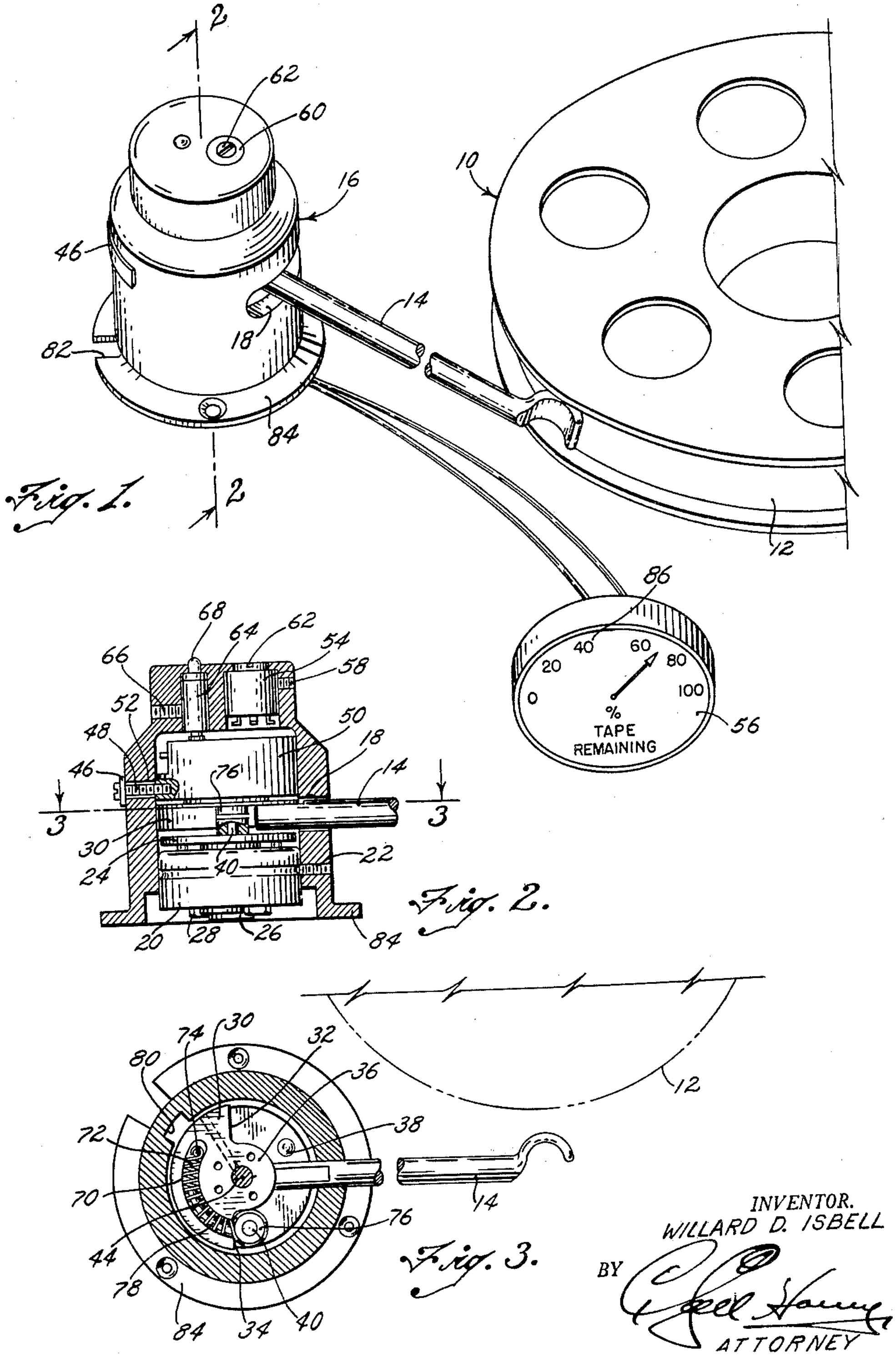
FIG. 1 is a perspective view of an automatic remote tape quantity transmitter for tape recording equipment made pursuant to my present invention showing the same operably associated with a roll of tape.
FIG. 2 is a cross-sectional view taken on line 2—2 of FIG. 1.
FIG. 3 is a cross-sectional view taken on line 3—3 of FIG. 2.
Figure 4:
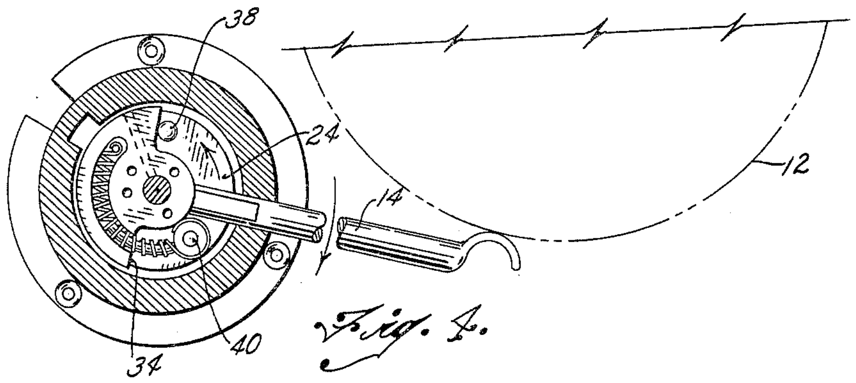
FIGS. 4 and 5 are cross-sectional views similar to FIG. 3 illustrating different positions of the feeler arm with respect to the tape.
Figure 5:
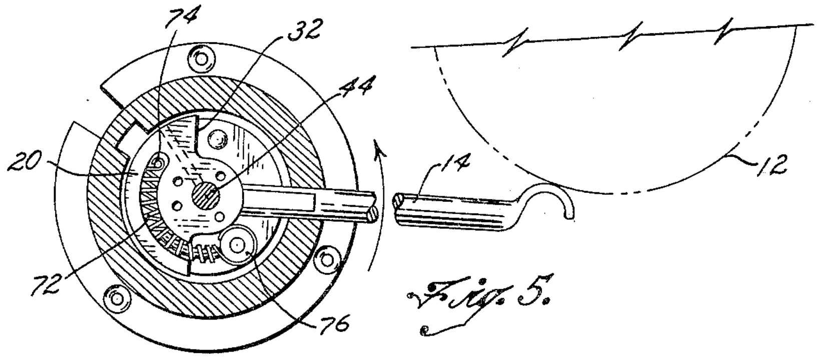

Reel 10, shown in FIG. 1 of the drawings, is illustrative of the common means employed in recording equipment for a supply of tape 12 in the nature of a roll that is also schematically shown in phantom in FIGS. 3 to 5 inclusive.

Basically, the device forming the subject matter of the instant invention is designed to measure and indicate the length of tape 12 remaining on the reel 10, and to this end, there is provided a feeler arm 14 that bears against the outermost convolution of the roll of tape 12, arm 14 moving inwardly toward the axis of rotation of the reel 10 as the convolutions of the tape 12 decrease.

Virtually all of the essential components of the device are contained within a hollow body 16 having an elongated slot 18 clearing the arm 14 for swinging movement toward and away from the tape 12.

A rotary solenoid 20 is retained in the housing 16 adjacent the lowermost end thereof by a plurality of setscrews 22. Solenoid 20 has a circular plate 24 rigidly secured to its oscillatory shaft 26 and a spring 28 coiled about the shaft 26 and interconnecting the latter with the housing of solenoid 20 yieldably biases the shaft 26 and, therefore, the plate 24 toward one end of its rotary path of travel.

A semi-circular counterbalance weight 30 provided with a pair of shoulders 32 and 34 overlies the plate 24 in housing 16. Shoulders 32 and 34 are substantially radial with respect to a hub 36 forming an integral part of the counterbalance weight 30, and it is to such hub 36 that the innermost end of arm 14 is attached, arm 14 being radial with respect to hub 36 substantially midway between the shoulders 32 and 34.

Arm 14 is disposed between a pair of upstanding studs 38 and 40 rigidly to plate 24 and engageable wtih shoulders 32 and 34 respectively, but spaced sufficiently therefrom to permit limited swinging movement of the arm 14 relative to the plate 24.

Figure 6:
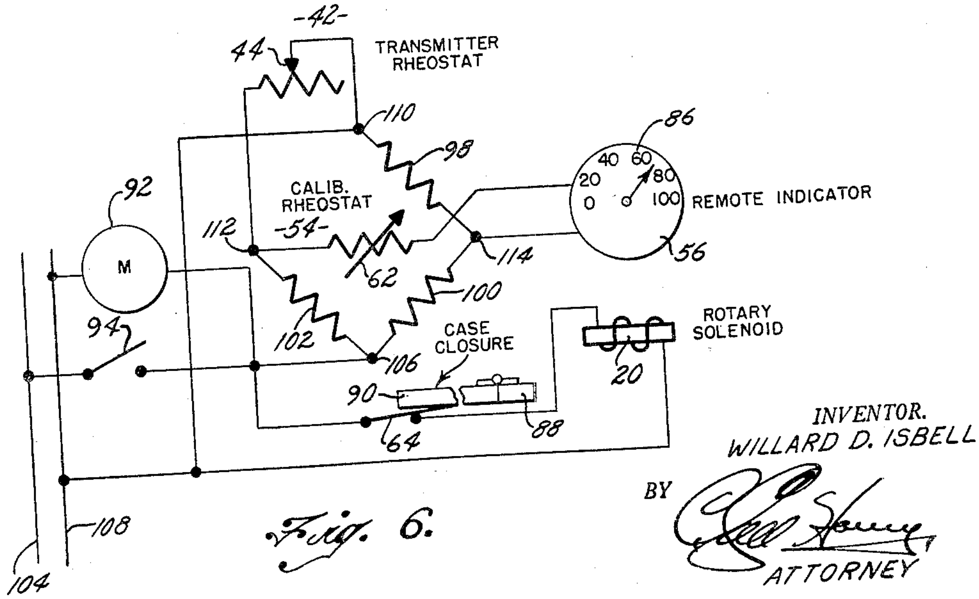
FIG. 6 is a schematic diagrammatical view illustrating the electrical components of the device.

An instrument for measuring and indicating the length of tape 12 in the reel 10 includes, as shown in FIG. 6, a rheostat 42 within the housing 16 above counterbalance weight 30 and provided with a rotatable tap 44 depending therefrom and connected directly to hub 36.

Rheostat 42 is connected to the housing 16 by a strap 46 and a plurality of fasteners 48 threaded into ring mount 50 for rheostat 42. Fasteners 48 extend through strap 46 and elongated slots 52 within housing 16, permitting rotation of the rheostat 42 for zero adjustment purposes.

A rheostat 54 providing calibration adjustment for a remote indicator 56 is operably coupled with the rheostat 42 and operates as the transmitter for indicator 56. Rheostat 54 is held within housing 16 by a setscrew 58 and extends into an opening 60 in the closed end of body 16, rendering adjusting tap 62 for rheostat 54 readily accessible.

A switch 64 for solenoid 20 is held within the housing 16 by setscrew 66 and its actuating button 68 extends outwardly beyond the body 16.

An arcuate, upwardly facing groove 70 in the counterbalance weight 30 and extending from the shoulder 34 toward the shoulder 32 in concentric relationship to tap 44, receives a coil spring 72 having one end thereof secured to a pin 74 rigid to weight 30 in groove 70. The opposite end of the spring 72 is attached to a collar 76 on stud 40. Collar 76 has an elongated, arcuate finger-like guide 78 for the spring 72 extending into the latter and integral with the collar 76.

All of the electrical wiring from switch 64, rheostat 54, and solenoid 20, is disposed in an internal groove 80 in housing 16 adjacent a notch 82 in mounting flange 84.

The remote indicator 56, in the nature of a current meter, is provided with calibrations 86 for indicating the percent of tape 12 remaining in reel 10, as shown, or in units of feet or time as may be desired.

Manifestly, tape recorders or the like are conventionally provided with a case containing the reel 10 and other components, which case is designated only in FIG. 6 by the numeral 88. A lid or other closure for the case 88 is designated in FIG. 6 by the numeral 90 and shown in close proximity to the switch 64 so that the latter is closed when the lid 90 is moved to the closed position, but which switch 64 automatically opens when the lid 90 is opened.

A capstan for driving tape 12 is normally operated by an electric motor 92 whose circuit is energized by closing switch 94. When the lid 90 is closed, a reading may be obtained from the indicator 56 as soon as the recorder is placed in operation by closing switch 94.

Referring now more specifically to FIG. 6, it will be perceived that the rheostat 42 is incorporated as one arm of a conventional measuring bridge circuit also including resistance arms 98, 100 and 102. When switch 94 is closed, one side 104 of a source of electrical current will be coupled with a diagonal point 106 of the bridge circuit 42, 98, 100, 102 between resistance arms 100 and 102 thereof, and the other side 108 of such power source will be coupled with the opposite diagonal point 110 between resistance arms 42 and 98.

The indicator 56, which may comprise a millimeter or other current responsive device, is coupled between the other diagonal points 112 and 114 of the bridge circuit 42, 98, 100 and 102, and the rheostat 54 is interposed in series therewith.

In operation, the bridge circuit may be balanced or calibrated by adjustment of the tap or resistance varying means 62 of the rheostat 54 while the tap 44 of the transmitter rheostat 42 is situated at a predetermined position thereof so that the indicating meter 56 will read an appropriate value of feet of tape remaining corresponding to the location of the tap 44. Normally, this balancing adjustment will be made with the tap 44 in a position corresponding to zero feet of tape remaining. The adjustment 62 of rheostat 54 may then be left set in such position, it being understood by those skilled in the art that the values of the resistances 42, 98, 100 and 102 are so chosen as to permit a predetermined calibration of the remaining scale of the indicator 56.

Manifestly, adjustment of the rheostat 42 is accomplished by loosening screws 48 and shifting strap 46 and holder 50 with respect to tap 44 and, therefore, with respect to arm 14.

When solenoid 20 is energized, disc 24 rotates in the direction of the arrow shown on solenoid 20 in FIG. 4, thereby tensioning spring 72 and swinging weight 30 until the arm 14 moves into contact with the outer convolution of tape 12 in the manner shown in FIG. 4. The position of the studs 38 and 40 do not change as arm 14 moves inwardly under influence of the spring 72 in response to decrease in the convolutions of the tape 12 as shown in FIG. 5.

As soon as solenoid 20 is de-energized, the studs 38 and 40 return to the position shown in FIG. 3 and as the collar 76 moves against the shoulder 34, arm 14 is retracted away from the tape 12 and clear of the reel 10.

Consequently, the reel 10 may be removed without danger of damage to the device whether or not the recorder is in operation, since opening of the closure 90 to gain access to the reel 10, automatically opens switch 64 for the circuit of solenoid 20. Conversely, when the lid 90 is closed, the operator is always assured of the fact that arm 14 is in engagement with the tape 12 and, therefore, in position to indicate the amount of remaining tape, whenever the recorder is placed in operation.

Having thus described the invention what is claimed as new and desire to be secured by Letters Patent is:

1. In apparatus having a rotatable, motor driven reel provided with a roll of tape and a feeler arm adapted to engage the outer convolution of said tape with the arm being movable in one direction toward the axis of rotation of the reel as the convolutions decrease and in the opposite direction when the arm is to be retracted from the tape, the improvement of which comprises a support, an instrument on the support and adapted to be operably coupled with said arm for mounting the latter adjacent the reel to permit the measurement of tape remaining thereon; a prime mover carried by the support and having a shiftable element thereon, said prime mover being actuated upon the actuation of the reel drive motor to thereby shift said element into an operative position; and yieldable means interconnecting the element and the arm for biasing the latter in said one direction when said element is shifted into said operative position.

2. In apparatus having a rotatable, motor driven reel provided with a roll of tape and an arm adapted to engage the outer convolution of said tape, said arm being swingable in one direction toward the axis of rotation of the reel as the convolutions decrease, and in the opposite direction when the arm is to be retracted from the tape, a support; an instrument on said support for measuring and indicating the movement of the arm including a rheostat having a rotatable shaft upon which the arm is adapted to be rigidly mounted; a rotary solenoid carried by the support and having an element rotatable therewith, said solenoid being actuated upon the actuation of said reel drive motor to rotate said element from a first position to a second position, there being a spring on the solenoid for returning said element to said first position when said solenoid is de-actuated; and a spring interconnecting the element and the arm and tensioned to yieldably bias the latter in said one direction when said element is rotated to second position thereof.

3. In apparatus as set forth in claim 2, wherein the axis of rotation of said shaft is substantially coaxially aligned with the axis of rotation of said element.

4. In apparatus as set forth in claim 2, wherein said element comprises a disc having a pair of circumferentially spaced studs thereon extending outwardly from one face thereof providing stop means for limiting the rotation of said arm.

5. In apparatus having a rotatable, motor driven reel provided with a roll of tape thereon and a feeler arm provided with an end portion engageable with the outer convolution of the tape, an instrument adapted to be disposed in spaced relationship to said reel and to be operably coupled with said arm adjacent the opposite end of the latter for mounting the arm adjacent said reel to permit the measurement of the amount of tape remaining on the reel in response to the rotation of the arm in one direction and the movement of said end portion toward the axis of rotation of the reel as the tape is removed therefrom, said instrument including a support; a shaft rotatably mounted on said support, the opposite end of said arm adapted to be operably coupled with said shaft for rotation therewith; electrically actuated rheostat means on the support, operably coupled with said shaft and adapted to be operably coupled with an electrical circuit provided with a tape-indicating device for varying the electrical current in said circuit as said shaft is rotated under the influence of the rotation of the arm; actuatable power means carried by the support provided with a shiftable element thereon and actuated upon the actuation of said reel drive motor for shifting said element with respect to said support from a first position to a second position when said reel is caused to be rotated; and resilient means secured to said element and adapted to be secured to said arm adjacent the opposite end thereof for biasing said arm in said one direction when said element is in said second position, there being means on said power means for returning said element to said first position thereof when said power means is deactuated, whereby said end portion of the arm is caused to engage said tape when said reel is rotating and is caused to be retracted away from the reel when said reel is stationary.

References Cited in the file of this patent

UNITED STATES PATENTS

| | | |
|---|---|---|
| 1,300,257 | Felland | Apr. 15, 1919 |
| 1,535,520 | Cvithovich | Apr. 28, 1925 |
| 1,583,656 | Chapman et al. | May 4, 1926 |
| 1,688,330 | Gunther et al. | Oct. 23, 1928 |
| 2,030,244 | Cox | Feb. 11, 1936 |
| 2,254,326 | Sontagh | Sept. 2, 1941 |
| 2,819,647 | Golick et al. | Jan. 14, 1958 |